US012694752B2

(12) United States Patent
LeMay et al.

(10) Patent No.: US 12,694,752 B2
(45) Date of Patent: *Jul. 28, 2026

(54) EMAILING OR TEXTING AS COMMUNICATION BETWEEN MOBILE DEVICE AND EGM

(71) Applicant: IGT, Las Vegas, NV (US)

(72) Inventors: Steven G. LeMay, Reno, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 291 days.

This patent is subject to a terminal disclaimer.

(21) Appl. No.: 18/135,561

(22) Filed: Apr. 17, 2023

(65) Prior Publication Data

US 2023/0252844 A1 Aug. 10, 2023

Related U.S. Application Data

(63) Continuation of application No. 16/598,809, filed on Oct. 10, 2019, now Pat. No. 11,645,885, which is a continuation of application No. 15/092,410, filed on Apr. 6, 2016, now Pat. No. 10,453,297, which is a
(Continued)

(51) Int. Cl.
G07F 17/00 (2006.01)
G06Q 20/32 (2012.01)
G07F 17/32 (2006.01)

(52) U.S. Cl.
CPC ....... *G07F 17/3225* (2013.01); *G06Q 20/322* (2013.01); *G06Q 20/3255* (2013.01); *G07F 17/32* (2013.01); *G07F 17/3227* (2013.01);

*G07F 17/323* (2013.01); *G07F 17/3244* (2013.01); *G07F 17/3258* (2013.01); *G07F 17/3281* (2013.01)

(58) Field of Classification Search
None
See application file for complete search history.

(56) References Cited

U.S. PATENT DOCUMENTS

| | | | |
|---|---|---|---|
| 3,662,105 A | 5/1972 | Parks |
| 4,071,689 A | 1/1978 | Talmage |
| 4,072,930 A | 2/1978 | Lucero |
| (Continued) | | |

OTHER PUBLICATIONS

Examination Report No. 1 for Australian Patent Application No. 2019279997 dated Dec. 11, 2020.
(Continued)

*Primary Examiner* — Paul A D'Agostino
(74) *Attorney, Agent, or Firm* — Neal, Gerber & Eisenberg LLP

(57) ABSTRACT

A gaming system compatible with patron-controlled portable electronic devices, such as smart phones or tablet computers, is described. Via E-mailing or texting, a server can mediate communications between a user-controlled device, such as a mobile device, and an EGM. In one embodiment, for a transaction involving interactions with a user-controlled device and an EGM, the server can be configured to create a temporary e-mail or text message address. In particular embodiments, a transaction can involve transferring credits to or from the EGM or transferring game play related information from the EGM to a user specified location.

20 Claims, 5 Drawing Sheets

Related U.S. Application Data continuation of application No. 13/433,007, filed on Mar. 28, 2012, now Pat. No. 9,311,769.

(56) References Cited

U.S. PATENT DOCUMENTS

| | | | |
|---|---|---|---|
| 4,283,709 A | 8/1981 | Lucero |
| 4,339,709 A | 7/1982 | Brihier |
| 4,339,798 A | 7/1982 | Hedges |
| 4,553,222 A | 11/1985 | Kurland |
| 4,856,787 A | 8/1989 | Itkis |
| 5,038,022 A | 8/1991 | Lucero |
| 5,042,809 A | 8/1991 | Richardson |
| 5,048,831 A | 9/1991 | Sides |
| 5,179,517 A | 1/1993 | Sarbin |
| 5,221,838 A | 6/1993 | Gutman |
| 5,371,345 A | 12/1994 | Lestrange |
| 5,429,361 A | 7/1995 | Raven |
| 5,457,306 A | 10/1995 | Lucero |
| 5,470,079 A | 11/1995 | Lestrange |
| 5,483,049 A | 1/1996 | Schulze, Jr. |
| 5,559,312 A | 9/1996 | Lucero |
| 5,618,045 A | 4/1997 | Kagan |
| 5,643,086 A | 7/1997 | Alcorn |
| 5,655,961 A | 8/1997 | Acres |
| 5,676,231 A | 10/1997 | Legras |
| 5,702,304 A | 12/1997 | Acres |
| 5,718,632 A | 2/1998 | Hayashi |
| 5,741,183 A | 4/1998 | Acres |
| 5,759,102 A | 6/1998 | Pease |
| 5,761,647 A | 6/1998 | Boushy |
| 5,768,382 A | 6/1998 | Schneier |
| 5,769,716 A | 6/1998 | Saffari |
| 5,770,533 A | 6/1998 | Franchi |
| 5,779,545 A | 7/1998 | Berg |
| 5,788,573 A | 8/1998 | Baerlocher |
| 5,795,228 A | 8/1998 | Trumbull |
| 5,796,389 A | 8/1998 | Bertram |
| 5,797,085 A | 8/1998 | Beuk |
| 5,809,482 A | 9/1998 | Strisower |
| 5,811,772 A | 9/1998 | Lucero |
| 5,816,918 A | 10/1998 | Kelly |
| 5,818,019 A | 10/1998 | Irwin, Jr. |
| 5,833,536 A | 11/1998 | Davids |
| 5,833,540 A | 11/1998 | Miodunski |
| 5,836,819 A | 11/1998 | Ugawa |
| 5,851,148 A | 12/1998 | Brune |
| 5,871,398 A | 2/1999 | Schneier |
| D406,612 S | 3/1999 | Johnson |
| 5,885,158 A | 3/1999 | Torango |
| 5,919,091 A | 7/1999 | Bell |
| 5,951,397 A | 9/1999 | Dickinson |
| 5,952,640 A | 9/1999 | Lucero |
| 5,954,583 A | 9/1999 | Green |
| 5,957,776 A | 9/1999 | Hoehne |
| 5,959,277 A | 9/1999 | Lucero |
| 5,967,896 A | 10/1999 | Jorasch |
| 5,971,271 A | 10/1999 | Wynn |
| 5,984,779 A | 11/1999 | Bridgeman |
| 5,999,808 A | 12/1999 | Ladue |
| 6,001,016 A | 12/1999 | Walker |
| 6,003,013 A | 12/1999 | Boushy |
| 6,003,651 A | 12/1999 | Waller |
| 6,010,404 A | 1/2000 | Walker |
| 6,012,832 A | 1/2000 | Saunders |
| 6,012,983 A | 1/2000 | Walker |
| 6,019,283 A | 2/2000 | Lucero |
| 6,038,666 A | 3/2000 | Hsu |
| 6,048,269 A | 4/2000 | Burns |
| 6,050,895 A | 4/2000 | Luciano, Jr. |
| 6,062,981 A | 5/2000 | Luciano |
| 6,068,552 A | 5/2000 | Walker |
| 6,077,163 A | 6/2000 | Walker |
| 6,089,975 A | 7/2000 | Dunn |
| 6,099,408 A | 8/2000 | Schneier |
| 6,104,815 A | 8/2000 | Alcorn |

| | | | |
|---|---|---|---|
| 6,106,396 A | 8/2000 | Alcorn |
| 6,110,041 A | 8/2000 | Walker |
| 6,113,492 A | 9/2000 | Walker |
| 6,113,493 A | 9/2000 | Walker |
| 6,113,495 A | 9/2000 | Walker |
| 6,135,884 A | 10/2000 | Hedrick |
| 6,135,887 A | 10/2000 | Pease |
| 6,139,431 A | 10/2000 | Walker |
| 6,141,711 A | 10/2000 | Shah |
| 6,142,369 A | 11/2000 | Jonstromer |
| 6,149,522 A | 11/2000 | Alcorn |
| 6,161,059 A | 12/2000 | Tedesco |
| 6,162,121 A | 12/2000 | Morro |
| 6,162,122 A | 12/2000 | Acres |
| 6,174,234 B1 | 1/2001 | Seibert, Jr. |
| 6,182,221 B1 | 1/2001 | Hsu |
| 6,183,362 B1 | 2/2001 | Boushy |
| 6,190,256 B1 | 2/2001 | Walker |
| 6,206,283 B1 | 3/2001 | Bansal |
| 6,210,279 B1 | 4/2001 | Dickinson |
| 6,223,166 B1 | 4/2001 | Kay |
| 6,227,972 B1 | 5/2001 | Walker |
| 6,244,958 B1 | 6/2001 | Acres |
| 6,247,643 B1 | 6/2001 | Lucero |
| 6,253,119 B1 | 6/2001 | Dabrowski |
| 6,264,560 B1 | 7/2001 | Goldberg |
| 6,264,561 B1 | 7/2001 | Saffari |
| 6,267,671 B1 | 7/2001 | Hogan |
| 6,270,410 B1 | 8/2001 | Demar |
| 6,280,328 B1 | 8/2001 | Holch |
| 6,285,868 B1 | 9/2001 | Ladue |
| 6,293,866 B1 | 9/2001 | Walker |
| 6,302,790 B1 | 10/2001 | Brossard |
| 6,307,956 B1 | 10/2001 | Black |
| 6,319,125 B1 | 11/2001 | Acres |
| 6,341,353 B1 | 1/2002 | Herman |
| 6,368,216 B1 | 4/2002 | Hedrick |
| 6,371,852 B1 | 4/2002 | Acres |
| 6,378,073 B1 | 4/2002 | Davis |
| 6,379,246 B1 | 4/2002 | Dabrowski |
| 6,383,076 B1 | 5/2002 | Tiedeken |
| 6,409,595 B1 | 6/2002 | Uihlein |
| 6,409,602 B1 | 6/2002 | Wiltshire |
| 6,443,843 B1 | 9/2002 | Walker |
| 6,450,885 B2 | 9/2002 | Schneier |
| 6,488,585 B1 | 12/2002 | Wells |
| 6,496,928 B1 | 12/2002 | Deo |
| 6,530,835 B1 | 3/2003 | Walker |
| 6,561,903 B2 | 5/2003 | Walker |
| 6,581,161 B1 | 6/2003 | Byford |
| 6,582,310 B1 | 6/2003 | Walker |
| 6,585,598 B2 | 7/2003 | Nguyen |
| 6,628,939 B2 | 9/2003 | Paulsen |
| 6,634,550 B1 | 10/2003 | Walker |
| 6,648,761 B1 | 11/2003 | Izawa |
| 6,676,522 B2 | 1/2004 | Rowe |
| 6,682,421 B1 | 1/2004 | Rowe |
| 6,685,567 B2 | 2/2004 | Cockerille |
| 6,702,670 B2 | 3/2004 | Jasper |
| 6,709,333 B1 | 3/2004 | Bradford |
| 6,739,975 B2 | 5/2004 | Nguyen |
| 6,758,393 B1 | 7/2004 | Luciano |
| 6,800,029 B2 | 10/2004 | Rowe |
| 6,846,238 B2 | 1/2005 | Wells |
| 6,869,362 B2 * | 3/2005 | Walker .................... G07F 17/40 |
| | | | 463/19 |
| 6,880,079 B2 | 4/2005 | Kefford |
| 6,896,618 B2 | 5/2005 | Benoy |
| 6,905,411 B2 | 6/2005 | Nguyen |
| 6,969,319 B2 | 11/2005 | Rowe |
| 7,004,388 B2 | 2/2006 | Kohta |
| 7,004,837 B1 | 2/2006 | Crowder, Jr. |
| 7,153,210 B2 | 12/2006 | Yamagishi |
| 7,167,724 B2 | 1/2007 | Yamagishi |
| 7,275,991 B2 | 10/2007 | Burns |
| 7,331,520 B2 | 2/2008 | Silva |
| 7,335,106 B2 | 2/2008 | Johnson |
| 7,337,330 B2 | 2/2008 | Gatto |
| 7,341,522 B2 | 3/2008 | Yamagishi |

(56) References Cited

U.S. PATENT DOCUMENTS

| | | | |
|---|---|---|---|
| 7,416,485 | B2 | 8/2008 | Walker et al. |
| 7,419,428 | B2 | 9/2008 | Rowe |
| 7,467,999 | B2 | 12/2008 | Walker et al. |
| 7,477,889 | B2 | 1/2009 | Kim |
| 7,510,474 | B2 | 3/2009 | Carter, Sr. |
| 7,545,522 | B1 | 6/2009 | Lou |
| 7,552,341 | B2 | 6/2009 | Chen |
| 7,594,855 | B2 | 9/2009 | Meyerhofer |
| 7,611,409 | B2 | 11/2009 | Muir |
| 7,644,861 | B2 | 1/2010 | Alderucci |
| 7,693,306 | B2 | 4/2010 | Huber |
| 7,699,703 | B2 | 4/2010 | Muir |
| 7,753,789 | B2 | 7/2010 | Walker et al. |
| 7,758,420 | B2 | 7/2010 | Saffari |
| 7,771,271 | B2 | 8/2010 | Walker et al. |
| 7,785,193 | B2 | 8/2010 | Paulsen |
| 7,846,017 | B2 | 12/2010 | Walker et al. |
| 7,850,522 | B2 | 12/2010 | Walker et al. |
| 7,883,417 | B2 | 2/2011 | Bruzzese |
| 7,950,996 | B2 | 5/2011 | Nguyen |
| 7,988,550 | B2 | 8/2011 | White |
| 7,997,972 | B2 | 8/2011 | Nguyen |
| 8,016,666 | B2 | 9/2011 | Angell |
| 8,023,133 | B2 | 9/2011 | Kaneko |
| 8,038,527 | B2 | 10/2011 | Walker et al. |
| 8,057,303 | B2 | 11/2011 | Rasmussen |
| 8,079,904 | B2 | 12/2011 | Griswold |
| 8,096,872 | B2 | 1/2012 | Walker et al. |
| 8,118,668 | B2 | 2/2012 | Gagner et al. |
| 8,144,356 | B2 | 3/2012 | Meyerhofer |
| 8,157,642 | B2 | 4/2012 | Paulsen |
| 8,192,276 | B2 | 6/2012 | Walker |
| 8,219,129 | B2 | 7/2012 | Brown |
| 8,220,019 | B2 | 7/2012 | Stearns |
| 8,259,596 | B1 | 9/2012 | Oak |
| 8,282,465 | B2 | 10/2012 | Giobbi |
| 8,282,490 | B2 | 10/2012 | Arezina |
| 8,286,856 | B2 | 10/2012 | Meyerhofer |
| 8,393,955 | B2 | 3/2013 | Arezina et al. |
| 8,419,548 | B2 | 4/2013 | Gagner |
| 8,469,800 | B2 | 6/2013 | Lemay et al. |
| 8,512,144 | B2 | 8/2013 | Johnson et al. |
| 8,550,903 | B2 | 10/2013 | Lyons |
| 8,597,108 | B2 | 12/2013 | Nguyen |
| 8,597,111 | B2 | 12/2013 | Lemay et al. |
| 8,602,875 | B2 | 12/2013 | Nguyen |
| 8,608,569 | B2 | 12/2013 | Carrico |
| 8,613,659 | B2 | 12/2013 | Nelson |
| 8,613,668 | B2 | 12/2013 | Nelson et al. |
| 8,622,836 | B2 | 1/2014 | Nelson et al. |
| 8,721,434 | B2 | 5/2014 | Nelson et al. |
| 8,734,236 | B2 | 5/2014 | Arezina et al. |
| 8,827,813 | B2 | 9/2014 | Lemay et al. |
| 8,827,814 | B2 | 9/2014 | Lemay et al. |
| 8,845,422 | B2 | 9/2014 | Weber |
| 8,876,595 | B2 | 11/2014 | Nelson et al. |
| 8,932,140 | B2 | 1/2015 | Gagner et al. |
| 8,956,222 | B2 | 2/2015 | Lemay et al. |
| 9,011,236 | B2 | 4/2015 | Nelson et al. |
| 2001/0039204 | A1 | 11/2001 | Tanskanen |
| 2001/0044337 | A1 | 11/2001 | Rowe |
| 2002/0020603 | A1 | 2/2002 | Jones |
| 2002/0061778 | A1 | 5/2002 | Acres |
| 2002/0077182 | A1 | 6/2002 | Swanberg |
| 2002/0082070 | A1 | 6/2002 | Macke |
| 2002/0087641 | A1 | 7/2002 | Levosky |
| 2002/0090986 | A1 | 7/2002 | Cote |
| 2002/0094869 | A1 | 7/2002 | Harkham |
| 2002/0107066 | A1 | 8/2002 | Seelig |
| 2002/0111206 | A1 | 8/2002 | Van Baltz |
| 2002/0111209 | A1 | 8/2002 | Walker |
| 2002/0145035 | A1 | 10/2002 | Jones |
| 2002/0147047 | A1 | 10/2002 | Letovsky |
| 2002/0147049 | A1 | 10/2002 | Carter, Sr. |
| 2002/0163570 | A1 | 11/2002 | Phillips |
| 2002/0169623 | A1 | 11/2002 | Call |
| 2002/0183046 | A1 | 12/2002 | Joyce |
| 2002/0196342 | A1 | 12/2002 | Walker |
| 2003/0003988 | A1 | 1/2003 | Walker |
| 2003/0008707 | A1 | 1/2003 | Walker |
| 2003/0026404 | A1* | 2/2003 | Joyce ..................... H04W 12/12 |
| | | | 379/144.01 |
| 2003/0027632 | A1 | 2/2003 | Sines |
| 2003/0032485 | A1 | 2/2003 | Cockerille |
| 2003/0045354 | A1 | 3/2003 | Giobbi |
| 2003/0051971 | A1* | 3/2003 | Weiss .................. G07F 17/3255 |
| | | | 194/200 |
| 2003/0054868 | A1 | 3/2003 | Paulsen |
| 2003/0054881 | A1 | 3/2003 | Hedrick |
| 2003/0064805 | A1 | 4/2003 | Wells |
| 2003/0074259 | A1 | 4/2003 | Slyman, Jr. |
| 2003/0083126 | A1 | 5/2003 | Paulsen |
| 2003/0083943 | A1 | 5/2003 | Adams |
| 2003/0092477 | A1 | 5/2003 | Luciano, Jr. |
| 2003/0104865 | A1 | 6/2003 | Itkis |
| 2003/0141359 | A1 | 7/2003 | Dymovsky |
| 2003/0144052 | A1 | 7/2003 | Walker |
| 2003/0148812 | A1 | 8/2003 | Paulsen |
| 2003/0162591 | A1 | 8/2003 | Nguyen |
| 2003/0172037 | A1 | 9/2003 | Jung |
| 2003/0186739 | A1 | 10/2003 | Paulsen |
| 2003/0199321 | A1 | 10/2003 | Williams |
| 2003/0203756 | A1 | 10/2003 | Jackson |
| 2003/0224852 | A1 | 12/2003 | Walker |
| 2003/0228900 | A1 | 12/2003 | Yamagishi |
| 2004/0014514 | A1 | 1/2004 | Yacenda |
| 2004/0016797 | A1 | 1/2004 | Jones |
| 2004/0023721 | A1 | 2/2004 | Giobbi |
| 2004/0039635 | A1 | 2/2004 | Linde |
| 2004/0043814 | A1 | 3/2004 | Angell |
| 2004/0085293 | A1 | 5/2004 | Soper |
| 2004/0106454 | A1 | 6/2004 | Walker |
| 2004/0127277 | A1 | 7/2004 | Walker |
| 2004/0129773 | A1 | 7/2004 | Lute, Jr. |
| 2004/0147314 | A1 | 7/2004 | Lemay |
| 2004/0185935 | A1 | 9/2004 | Yamagishi |
| 2004/0190042 | A1 | 9/2004 | Ferlitsch |
| 2004/0192434 | A1 | 9/2004 | Walker |
| 2004/0199284 | A1 | 10/2004 | Hara |
| 2004/0209690 | A1 | 10/2004 | Bruzzese |
| 2004/0225565 | A1 | 11/2004 | Selman |
| 2004/0259640 | A1 | 12/2004 | Gentles |
| 2004/0266395 | A1 | 12/2004 | Pailles |
| 2005/0014544 | A1 | 1/2005 | Walker et al. |
| 2005/0020354 | A1 | 1/2005 | Nguyen |
| 2005/0049049 | A1 | 3/2005 | Griswold |
| 2005/0054438 | A1 | 3/2005 | Rothschild |
| 2005/0059485 | A1 | 3/2005 | Paulsen |
| 2005/0070257 | A1 | 3/2005 | Saarinen |
| 2005/0076242 | A1 | 4/2005 | Breuer |
| 2005/0101383 | A1 | 5/2005 | Wells |
| 2005/0130728 | A1 | 6/2005 | Nguyen |
| 2005/0227770 | A1 | 10/2005 | Papulov |
| 2005/0240484 | A1 | 10/2005 | Yan |
| 2005/0255911 | A1 | 11/2005 | Nguyen |
| 2005/0287852 | A1 | 12/2005 | Sugawara |
| 2006/0018450 | A1 | 1/2006 | Sandberg-Diment |
| 2006/0025206 | A1 | 2/2006 | Walker |
| 2006/0025207 | A1* | 2/2006 | Walker ............... G07F 17/3239 |
| | | | 463/25 |
| 2006/0025222 | A1 | 2/2006 | Sekine |
| 2006/0035707 | A1 | 2/2006 | Nguyen |
| 2006/0040741 | A1 | 2/2006 | Griswold |
| 2006/0046823 | A1 | 3/2006 | Kaminkow |
| 2006/0046834 | A1 | 3/2006 | Sekine |
| 2006/0046842 | A1 | 3/2006 | Mattice |
| 2006/0046855 | A1 | 3/2006 | Nguyen |
| 2006/0049624 | A1 | 3/2006 | Brosnan |
| 2006/0079333 | A1 | 4/2006 | Morrow |
| 2006/0089174 | A1 | 4/2006 | Twerdahl |
| 2006/0095291 | A1* | 5/2006 | Cherney ............... G06Q 30/02 |
| | | | 705/44 |
| 2006/0095790 | A1* | 5/2006 | Nguyen ................. G07F 9/026 |
| | | | 713/186 |

(56)  References Cited

U.S. PATENT DOCUMENTS

| | | | |
|---|---|---|---|
| 2006/0160621 A1 | 7/2006 | Rowe | |
| 2006/0165060 A1 | 7/2006 | Dua | |
| 2006/0166732 A1 | 7/2006 | Lechner | |
| 2006/0166741 A1 | 7/2006 | Boyd | |
| 2006/0173781 A1 | 8/2006 | Donner | |
| 2006/0189382 A1 | 8/2006 | Muir | |
| 2006/0223627 A1 | 10/2006 | Nozaki | |
| 2006/0226598 A1 | 10/2006 | Walker | |
| 2006/0246981 A1 | 11/2006 | Walker | |
| 2006/0247037 A1 | 11/2006 | Park | |
| 2006/0266598 A1 | 11/2006 | Baumgartner | |
| 2006/0271433 A1 | 11/2006 | Hughes | |
| 2006/0279781 A1 | 12/2006 | Kaneko | |
| 2006/0281554 A1 | 12/2006 | Gatto | |
| 2006/0287072 A1 | 12/2006 | Walker | |
| 2006/0287098 A1 | 12/2006 | Morrow | |
| 2007/0017979 A1 | 1/2007 | Wu | |
| 2007/0021198 A1 | 1/2007 | Muir | |
| 2007/0060302 A1 | 3/2007 | Fabbri | |
| 2007/0060372 A1 | 3/2007 | Yamagishi | |
| 2007/0117608 A1 | 5/2007 | Roper | |
| 2007/0117623 A1 | 5/2007 | Nelson | |
| 2007/0129150 A1 | 6/2007 | Crowder | |
| 2007/0129151 A1 | 6/2007 | Crowder | |
| 2007/0155469 A1 | 7/2007 | Johnson | |
| 2007/0159301 A1 | 7/2007 | Hirt | |
| 2007/0174809 A1 | 7/2007 | Brown | |
| 2007/0190494 A1 | 8/2007 | Rosenberg | |
| 2007/0202941 A1 | 8/2007 | Miltenberger | |
| 2007/0214080 A1* | 9/2007 | Babi | G06Q 20/108 |
| | | | 705/42 |
| 2007/0218971 A1 | 9/2007 | Berube | |
| 2007/0218985 A1 | 9/2007 | Okada | |
| 2007/0218991 A1 | 9/2007 | Okada | |
| 2007/0238505 A1 | 10/2007 | Okada | |
| 2008/0026816 A1 | 1/2008 | Sammon et al. | |
| 2008/0026823 A1 | 1/2008 | Wolf | |
| 2008/0026844 A1 | 1/2008 | Wells | |
| 2008/0070671 A1 | 3/2008 | Okada | |
| 2008/0076528 A1 | 3/2008 | Nguyen | |
| 2008/0076572 A1 | 3/2008 | Nguyen | |
| 2008/0085753 A1 | 4/2008 | Okada | |
| 2008/0123026 A1 | 5/2008 | Kwag | |
| 2008/0139303 A1* | 6/2008 | Patterson | G06Q 30/02 |
| | | | 463/25 |
| 2008/0139306 A1 | 6/2008 | Lutnick | |
| 2008/0166997 A1 | 7/2008 | Sun | |
| 2008/0182644 A1 | 7/2008 | Lutnick | |
| 2008/0200251 A1 | 8/2008 | Alderucci | |
| 2008/0207296 A1 | 8/2008 | Lutnick | |
| 2008/0213026 A1 | 9/2008 | Grabiec | |
| 2008/0234028 A1 | 9/2008 | Meyer | |
| 2008/0261682 A1 | 10/2008 | Phillips | |
| 2008/0268934 A1 | 10/2008 | Mattice | |
| 2008/0270302 A1 | 10/2008 | Beenau | |
| 2008/0293483 A1 | 11/2008 | Pickus | |
| 2008/0300061 A1 | 12/2008 | Zheng | |
| 2008/0305860 A1* | 12/2008 | Linner | G07F 17/3276 |
| | | | 463/25 |
| 2008/0305862 A1 | 12/2008 | Walker | |
| 2008/0305873 A1 | 12/2008 | Zheng | |
| 2008/0311971 A1 | 12/2008 | Dean | |
| 2008/0318655 A1 | 12/2008 | Davies | |
| 2009/0011821 A1 | 1/2009 | Griswold | |
| 2009/0023490 A1 | 1/2009 | Moshal | |
| 2009/0054149 A1 | 2/2009 | Brosnan | |
| 2009/0069074 A1* | 3/2009 | Silvestro | G07F 17/3255 |
| | | | 463/25 |
| 2009/0069075 A1* | 3/2009 | Silvestro | G07F 17/3225 |
| | | | 463/25 |
| 2009/0098943 A1 | 4/2009 | Weber | |
| 2009/0124350 A1 | 5/2009 | Iddings | |
| 2009/0125429 A1 | 5/2009 | Takayama | |
| 2009/0131134 A1 | 5/2009 | Baerlocher et al. | |

| | | | |
|---|---|---|---|
| 2009/0156303 A1* | 6/2009 | Kiely | G07F 17/3223 |
| | | | 463/29 |
| 2009/0186680 A1 | 7/2009 | Napolitano | |
| 2009/0197671 A1* | 8/2009 | Kelly | G07F 17/3267 |
| | | | 463/25 |
| 2009/0197684 A1 | 8/2009 | Arezina | |
| 2009/0227317 A1 | 9/2009 | Spangler | |
| 2009/0233715 A1 | 9/2009 | Ergen | |
| 2009/0275397 A1 | 11/2009 | Van Baltz | |
| 2009/0318220 A1* | 12/2009 | Arezina | G07F 17/3244 |
| | | | 463/25 |
| 2010/0004049 A1* | 1/2010 | Ching | G07F 17/3267 |
| | | | 463/43 |
| 2010/0012715 A1 | 1/2010 | Williams | |
| 2010/0016075 A1 | 1/2010 | Thomas | |
| 2010/0048297 A1 | 2/2010 | Dasgupta | |
| 2010/0062840 A1 | 3/2010 | Herrmann | |
| 2010/0062843 A1* | 3/2010 | Gagner | G07F 17/3255 |
| | | | 463/42 |
| 2010/0069160 A1 | 3/2010 | Barrett | |
| 2010/0087241 A1 | 4/2010 | Nguyen | |
| 2010/0087249 A1 | 4/2010 | Rowe | |
| 2010/0093421 A1 | 4/2010 | Nyman | |
| 2010/0093429 A1 | 4/2010 | Mattice | |
| 2010/0113061 A1 | 5/2010 | Holcman | |
| 2010/0113140 A1* | 5/2010 | Kelly | G07F 17/32 |
| | | | 463/30 |
| 2010/0113161 A1 | 5/2010 | Walker | |
| 2010/0173691 A1 | 7/2010 | Wolfe | |
| 2010/0174650 A1 | 7/2010 | Nonaka | |
| 2010/0178986 A1 | 7/2010 | Davis | |
| 2010/0219234 A1 | 9/2010 | Forbes | |
| 2010/0227670 A1* | 9/2010 | Arezina | G07F 17/3248 |
| | | | 463/25 |
| 2010/0227674 A1* | 9/2010 | Neo | G07F 17/3227 |
| | | | 463/44 |
| 2010/0234099 A1 | 9/2010 | Rasmussen | |
| 2010/0250787 A1 | 9/2010 | Miyata | |
| 2010/0304848 A1 | 12/2010 | Detlefsen | |
| 2010/0323785 A1 | 12/2010 | Motyl | |
| 2010/0323789 A1 | 12/2010 | Gabriele | |
| 2010/0331079 A1 | 12/2010 | Bytnar | |
| 2011/0015976 A1 | 1/2011 | Lempel | |
| 2011/0028199 A1 | 2/2011 | Luciano, Jr. | |
| 2011/0065496 A1 | 3/2011 | Gagner | |
| 2011/0065497 A1 | 3/2011 | Patterson, Jr. | |
| 2011/0076963 A1 | 3/2011 | Hatano | |
| 2011/0086691 A1 | 4/2011 | Luciano, Jr. | |
| 2011/0086696 A1 | 4/2011 | Macewan | |
| 2011/0098104 A1 | 4/2011 | Meyerhofer | |
| 2011/0118008 A1* | 5/2011 | Taylor | G06Q 20/32 |
| | | | 463/25 |
| 2011/0119098 A1 | 5/2011 | Miller | |
| 2011/0136576 A1 | 6/2011 | Kammler | |
| 2011/0207531 A1 | 8/2011 | Gagner | |
| 2011/0208418 A1 | 8/2011 | Looney | |
| 2011/0242565 A1 | 10/2011 | Armstrong | |
| 2011/0263325 A1* | 10/2011 | Atkinson | G07F 17/323 |
| | | | 463/31 |
| 2011/0287823 A1 | 11/2011 | Guinn | |
| 2011/0295668 A1 | 12/2011 | Charania | |
| 2011/0306400 A1 | 12/2011 | Nguyen | |
| 2011/0306401 A1 | 12/2011 | Nguyen | |
| 2011/0314153 A1 | 12/2011 | Bathiche | |
| 2012/0015735 A1 | 1/2012 | Abouchar | |
| 2012/0046110 A1 | 2/2012 | Amaitis | |
| 2012/0066048 A1 | 3/2012 | Foust | |
| 2012/0072111 A1 | 3/2012 | Davis | |
| 2012/0084131 A1 | 4/2012 | Bergel | |
| 2012/0094757 A1 | 4/2012 | Vago | |
| 2012/0122584 A1 | 5/2012 | Nguyen | |
| 2012/0122585 A1 | 5/2012 | Nguyen | |
| 2012/0129586 A1 | 5/2012 | Lutnick | |
| 2012/0129611 A1 | 5/2012 | Rasmussen | |
| 2012/0149561 A1 | 6/2012 | Ribi | |
| 2012/0158531 A1* | 6/2012 | Dion | G06Q 30/02 |
| | | | 705/26.1 |
| 2012/0160912 A1 | 6/2012 | Laracey | |

(56)                    References Cited

U.S. PATENT DOCUMENTS

| | | | |
|---|---|---|---|
| 2012/0187187 A1* | 7/2012 | Duff ....................... G06Q 10/00 235/382 |
| 2012/0190455 A1 | 7/2012 | Briggs |
| 2012/0221474 A1 | 8/2012 | Eicher |
| 2012/0252556 A1 | 10/2012 | Doyle |
| 2012/0271762 A1* | 10/2012 | Freeland ................ G06Q 20/10 705/39 |
| 2012/0290336 A1 | 11/2012 | Rosenblatt |
| 2012/0324135 A1 | 12/2012 | Goodman |
| 2013/0013389 A1 | 1/2013 | Vitti |
| 2013/0017884 A1 | 1/2013 | Price |
| 2013/0023339 A1 | 1/2013 | Davis |
| 2013/0053133 A1* | 2/2013 | Schueller ........... G06Q 20/3255 463/25 |
| 2013/0053136 A1 | 2/2013 | Lemay |
| 2013/0053148 A1 | 2/2013 | Nelson et al. |
| 2013/0065666 A1* | 3/2013 | Schueller ........... G06Q 20/3274 463/25 |
| 2013/0065668 A1 | 3/2013 | Lemay et al. |
| 2013/0065678 A1 | 3/2013 | Nelson et al. |
| 2013/0065686 A1 | 3/2013 | Lemay et al. |
| 2013/0130777 A1 | 5/2013 | Lemay et al. |
| 2013/0130778 A1 | 5/2013 | Anderson |
| 2013/0137509 A1 | 5/2013 | Weber et al. |
| 2013/0137510 A1 | 5/2013 | Weber et al. |
| 2013/0137516 A1 | 5/2013 | Griswold et al. |
| 2013/0165199 A1 | 6/2013 | Lemay |
| 2013/0165208 A1 | 6/2013 | Nelson |
| 2013/0165209 A1 | 6/2013 | Lemay |
| 2013/0165210 A1 | 6/2013 | Nelson |
| 2013/0165232 A1 | 6/2013 | Nelson |
| 2013/0196755 A1 | 8/2013 | Nelson |
| 2013/0252713 A1 | 9/2013 | Nelson et al. |
| 2013/0324237 A1 | 12/2013 | Adiraju et al. |
| 2014/0045586 A1 | 2/2014 | Allen et al. |
| 2014/0221099 A1 | 8/2014 | Johnson et al. |

OTHER PUBLICATIONS

Examination Report No. 1 for Australian Patent Application No. 2021277752 dated Dec. 22, 2022, 3 pages.

* cited by examiner

300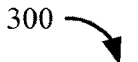
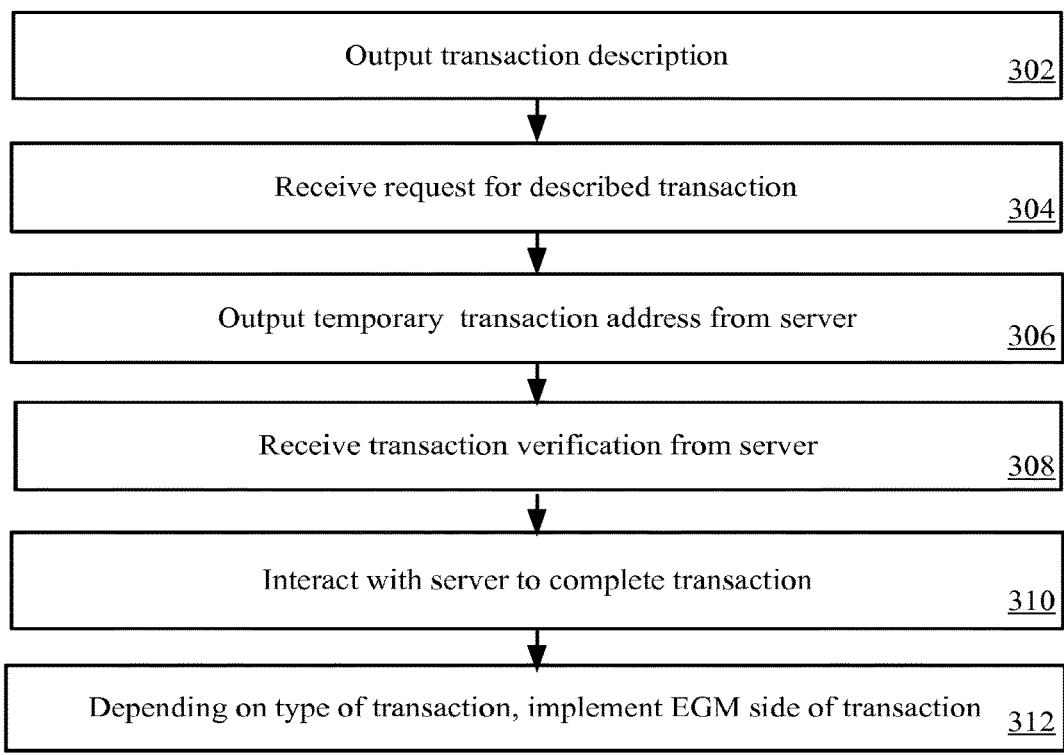
| Output transaction description | 302 |
| Receive request for described transaction | 304 |
| Output temporary transaction address from server | 306 |
| Receive transaction verification from server | 308 |
| Interact with server to complete transaction | 310 |
| Depending on type of transaction, implement EGM side of transaction | 312 |
*Fig. 2*

400

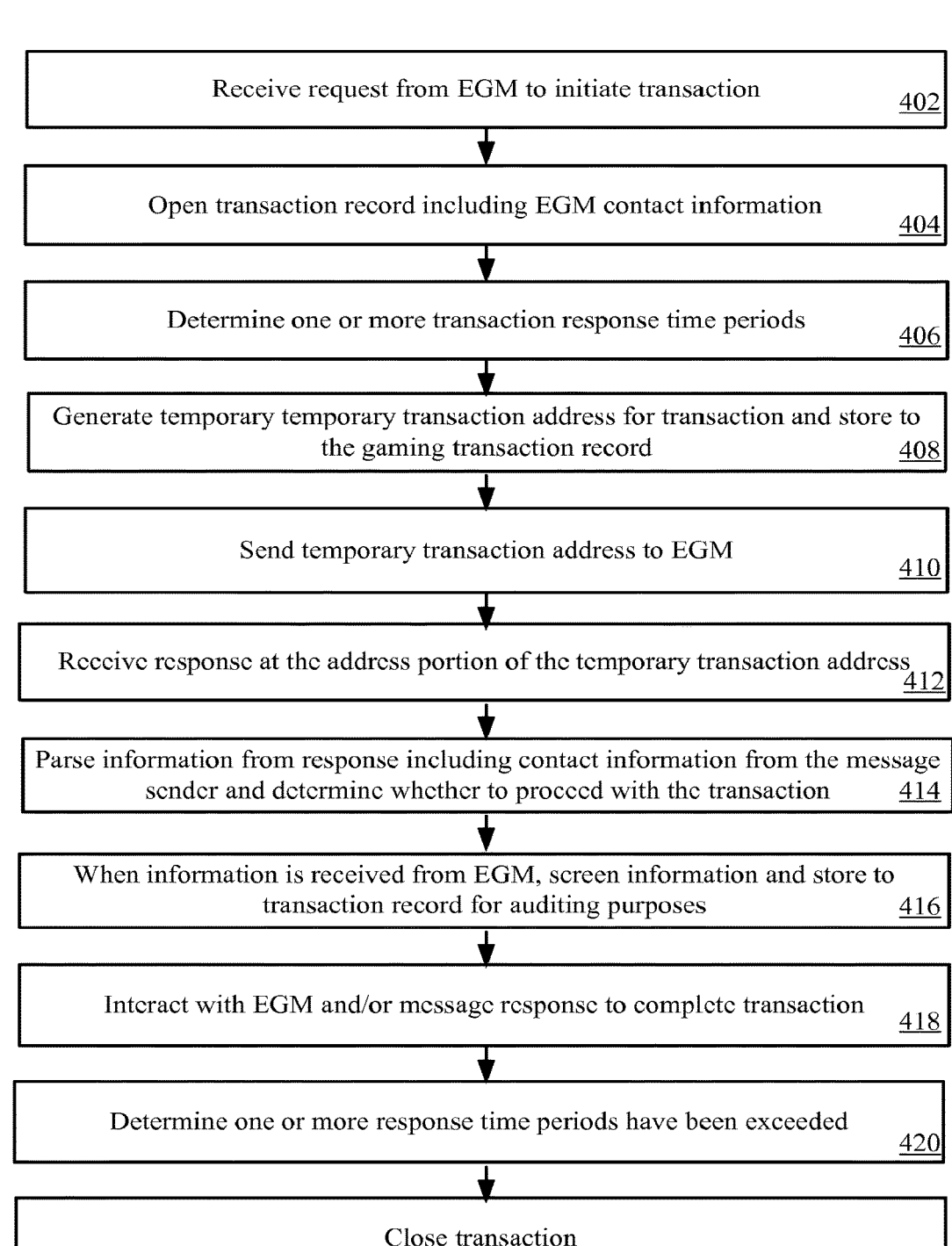

Receive request from EGM to initiate transaction                                    402

Open transaction record including EGM contact information                      404

Determine one or more transaction response time periods                        406

Generate temporary temporary transaction address for transaction and store to the gaming transaction record                                                                   408

Send temporary transaction address to EGM                                            410

Receive response at the address portion of the temporary transaction address      412

Parse information from response including contact information from the message sender and determine whether to proceed with the transaction                    414

When information is received from EGM, screen information and store to transaction record for auditing purposes                                            416

Interact with EGM and/or message response to complete transaction          418

Determine one or more response time periods have been exceeded              420

Close transaction                                                                                422

*Fig. 3*

Gaming System

600

Server

602

Network

601

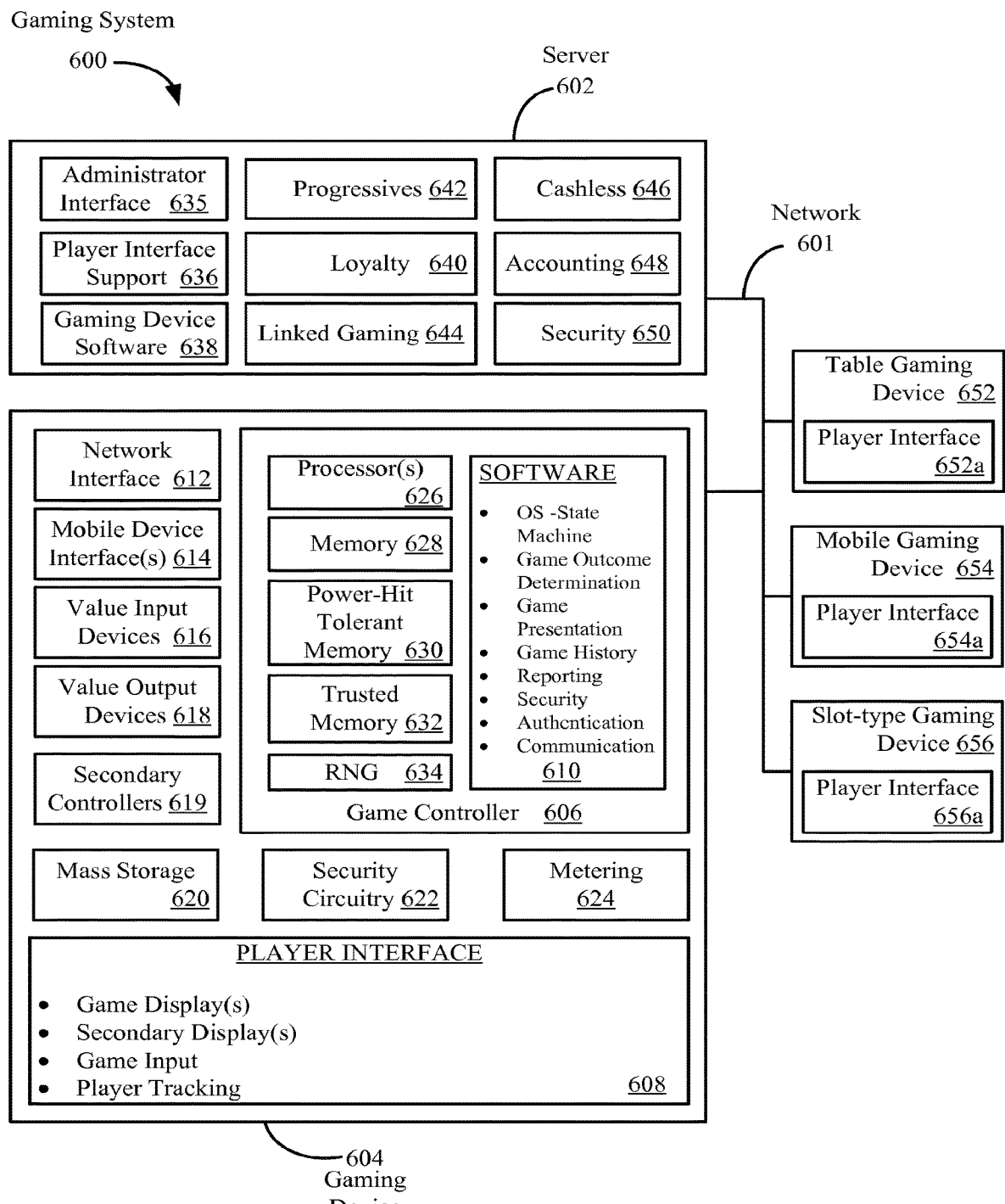

Administrator Interface 635

Progressives 642

Cashless 646

Player Interface Support 636

Loyalty 640

Accounting 648

Gaming Device Software 638

Linked Gaming 644

Security 650

Network Interface 612

Mobile Device Interface(s) 614

Value Input Devices 616

Value Output Devices 618

Secondary Controllers 619

Processor(s) 626

Memory 628

Power-Hit Tolerant Memory 630

Trusted Memory 632

RNG 634

Game Controller 606

SOFTWARE

- OS -State Machine
- Game Outcome Determination
- Game Presentation
- Game History
- Reporting
- Security
- Authentication
- Communication

610

Mass Storage 620

Security Circuitry 622

Metering 624

PLAYER INTERFACE

- Game Display(s)
- Secondary Display(s)
- Game Input
- Player Tracking

608

604
Gaming Device

Table Gaming Device 652

Player Interface 652a

Mobile Gaming Device 654

Player Interface 654a

Slot-type Gaming Device 656

Player Interface 656a

*Fig. 4*

EMAILING OR TEXTING AS COMMUNICATION BETWEEN MOBILE DEVICE AND EGM

PRIORITY CLAIM

This application is a continuation of, claims priority to and the benefit of U.S. patent application Ser. No. 16/598, 809, filed on Oct. 10, 2019, which is a continuation of, claims priority to and the benefit of U.S. patent application Ser. No. 15/092,410, filed on Apr. 6, 2016, now U.S. Pat. No. 10,453,297, which is a continuation of, claims priority to and the benefit of U.S. patent application Ser. No. 13/433, 007, filed on Mar. 28, 2012, now U.S. Pat. No. 9,311,769, the entire contents of which are each incorporated by reference herein.

BACKGROUND

1. Field of the Described Embodiments

The described embodiments relate generally to gaming systems, such as gaming systems deployed in a casino enterprise. More particularly, apparatus and method for enabling communications between an electronic gaming machine and portable electronic devices are described.

2. DESCRIPTION OF THE RELATED ART

Developing and maintaining a loyal customer base is a critical component of operating a successful casino enterprise. To develop a loyal customer base, casino enterprises attempt to generate interactions with their patrons that provide a unique and personalized game playing experience. As an example, casino enterprises offer patrons the opportunity to participate in a loyalty program. Via the loyalty program, patrons are offered various promotions and free items that encourage the patron to return to the casino.

In the loyalty program, the promotions can be tailored to the patron's preferences. As an example, if preferred, a patron can choose to receive promotional credits for game play on an electronic gaming machine and information regarding this preference can be stored to an account associated with the loyalty program. In general, information regarding the patron's preferences in regards to promotions as well as other activities within the casino enterprise, such as food, drink and room preferences, can be stored to their account associated with the loyalty program. The patron information stored in the account can be used to personalize the service and the game playing experience provided by the casino enterprise.

An ever increasing portion of patrons that visit casinos are regularly carrying portable electronic devices, such as smart phones, laptops, netbooks and tablet computers, on their person. The portable electronic devices provide 1) a means of communication allowing the patron to communicate with other individuals within or outside of a casino via a number of different communication modes, 2) a source of news and information, 3) a portal to the patron's on-line activities, such as social media applications, 4) support for entertainment features, such as audio/video playback and gaming applications, 5) a repository for personal information, such as financial information that enables financial transactions in a mobile wallet applications and 6) a means of capturing information, such as video images and audio recordings. Thus, portable electronic devices, such as smart phones, are becoming essential tools and in some instances, the primary electronic interface for many individuals.

The popularity of portable electronic devices allows for the possibility of utilizing their capabilities to further personalize and enhance the gaming experience in a casino gaming environment. In view of the above, methods and apparatus are desired that allow for complementary interactions with a portable electronic devices within a casino environment, such as when a patron is participating in game play on an electronic gaming machine.

SUMMARY OF THE DESCRIBED EMBODIMENTS

A gaming system compatible with patron-controlled portable electronic devices, such as smart phones, netbooks, laptops, tablet computers, smart cards and memory sticks, is described. The gaming system can include a server coupled to a number of different electronic wager-based gaming machines. The EGMs can be located within a single gaming establishment, such as a casino, or the EGMs can be distributed across multiple gaming establishments within a gaming enterprise.

The gaming system can allow communications involving text messages and/or e-mail messaging. In one embodiment, the server can be configured to mediate transactions involving an EGM and/a mobile device including real-time transaction. To enable the transactions, the server can generate a temporary e-mail or text messaging address for each transaction. Transaction information including a description of a potential transaction and a temporary communication address for the transaction can be output at the EGM.

At the EGM, the transaction description and/or temporary transaction address received from the server can be output under control of a game controller or a secondary controller. For example, a game controller which controls wager-based game can be configured to output a temporary transaction address and a message describing the potential gaming transaction based upon the received transaction description on a display. In another example, the gaming controller can instruct a printer to print a ticket including the temporary transaction address and the message describing the potential gaming transaction. In yet another example, a secondary controller in a secondary device, such as a player tracking unit or card reader, can be configured to output the temporary transaction address and a message describing the potential gaming transaction. The secondary controller may act independently or in conjunction with the game controller. For example, the second controller can control the transaction but request information from the game controller that allows the transaction to be completed.

In particular embodiments, the temporary transaction address can be used to uniquely reference a potential gaming transaction. The temporary transaction address can include a text or e-mail address portion and optionally unique information that are used to reference the potential gaming transaction, such as unique keywords. The unique information that references the potential gaming transaction can be included in the body of a message sent to the address portion of the temporary transaction address. When a message is sent to the address portion of the temporary transaction address, the message can be parsed for the unique information that references the gaming transaction. The parsed information can allow the message to be related to a gaming transaction that has been initiated using the temporary transaction address.

In one embodiment, a server in contact with the EGM can generate the unique information. For example, a message can be displayed, such as, "Text 'unique key word' to 54321 to receive a bonus offer at the EGM" where the unique key word and number are temporary transaction address. As another example, a message can be displayed, such as, "send e-mail to "bonus54321@casino.com to receive bonus offer at the EGM" where bonus54321 is a unique e-mail address for the transaction. In this example, since the e-mail address itself is unique, a unique key word doesn't need to be included in the body of the e-mail message.

When the server receives a text message including unique information associated with a gaming transaction, the server can interact with the device that sent the text message and/or an EGM to complete the transaction. The type of interactions that are needed will depend on the type of transaction that is being completed. In the example above of a bonus offer, the server may request additional information from the source that sent the message prior to enabling access to the promotional credits. After receiving the information (if it is required), the server can communicate with the EGM to make the promotional credits available on the EGM and complete the gaming transaction.

Many types of transactions are possible that involve using texting or e-mailing. For example, information associated with a user's game play experience on an, such as a screen shot of a big win, can be sent from the EGM to the server and then from the server to a user device, such as a user's mobile, device once the user makes contact with the server via the temporary address. In another example, EGM diagnostic information can be sent from the EGM to an operator controlled mobile device via the server. The server can be configured to verify that the operator controlled mobile device is approved to receive the information. In yet another example, after communications are established between a remote message source and the server using the temporary transaction address, the server can implement a promotion on the EGM, such as providing promotional credits on EGM or a transfer of actual credits from a user account to the EGM.

In one aspect the described embodiments can be generally characterized as comprising a method in a server of performing a gaming transaction involving an electronic gaming machine (EGM). The method can be generally characterized as comprising: 1) sending in a processor a temporary transaction address for a text or an e-mail message to the EGM wherein the temporary transaction address is output on the EGM; 2) opening in the processor a gaming transaction record for the gaming transaction; 3) storing to the gaming transaction record by the processor a) the temporary transaction address, b) identification information for the EGM, c) a time at which the temporary transaction address is sent; d) at least one time parameter wherein the time parameter is used to determine whether to close the gaming transaction before it has been completed and e) a first status indicator indicating the gaming transaction is open; 4) receiving in the processor the text or the e-mail message addressed to the temporary transaction address; and 5) in response to receiving the text or the e-mail message, in the processor, completing the gaming transaction including i) updating the first status indicator to indicate the gaming transaction is closed and ii) setting a second status indicator to indicate the gaming transaction was completed.

BRIEF DESCRIPTION OF THE DRAWINGS

The embodiments will be readily understood by the following detailed description in conjunction with the accompanying drawings, wherein like reference numerals designate like structural elements, and in which:

FIG. 2 shows a flow chart of a method in an EGM including temporary transaction addresses in accordance with the described embodiments.

FIG. 3 shows a flow chart of a method in a server including temporary transaction addresses in accordance with the described embodiments.

FIG. 4 shows a block diagram of a gaming device in accordance with the described embodiments.

DESCRIBED EMBODIMENTS

Figure 1:
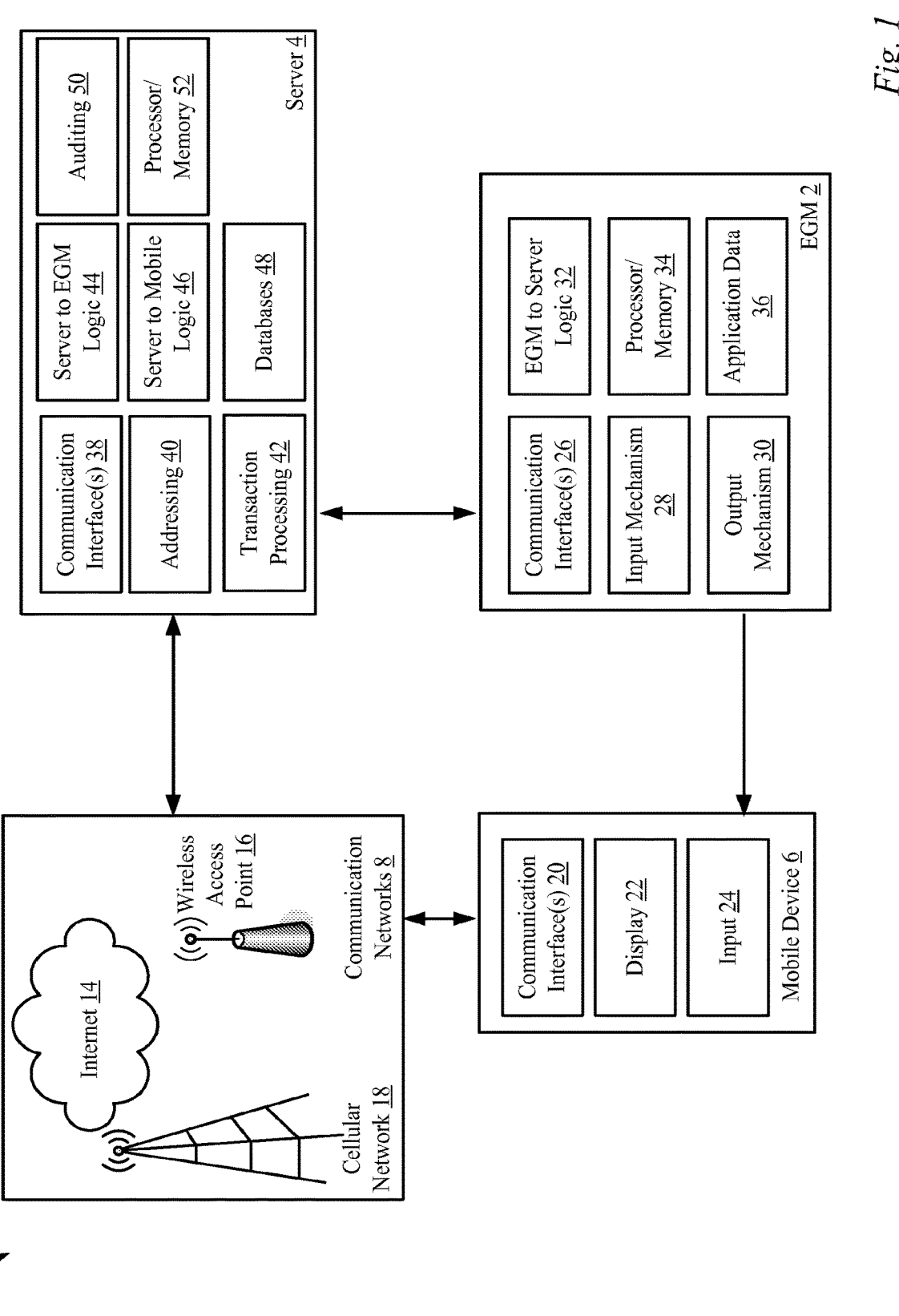
FIG. 1 shows a block diagram of a gaming system including EGMs, a server and mobile devices in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with portable electronic devices controlled by users of the gaming system is described. The gaming system can include a number of features that encourage and enable the use of portable electronic devices, such as smart phones and tablet computers, in a casino gaming environment. The gaming system can allow communications involving text messages and/or e-mail messaging. In one embodiment, the server can be configured to mediate gaming transactions involving an EGM and/a mobile device including real-time transactions.

To enable the gaming transactions, the server can generate a temporary transaction address including an e-mail or a text messaging address portion for each gaming transaction and optionally a reference component. In one embodiment, the e-mail or a text message address portion can be selected to uniquely reference the gaming transaction. Thus, the reference component is not needed.

In another embodiment, a unique reference component can be included with the text message or e-mail address portion of the temporary transaction address to allow the text message or e-mail address portion to be reused for multiple different gaming transactions. The reference component can be included in a text message or e-mail message sent to the address portion of the temporary transaction address. The reference component can be used to identify the gaming transaction with which the message is to be associated.

An EGM can be configured to output the temporary transaction address and a description of a gaming transaction that can be implemented using the temporary transaction address. Using the temporary transaction address, an EGM user can contact the server. For example, a user can send a text message to an address portion of the temporary transaction address from their mobile device to the server. As described above, a reference component can be included in the body of the message to uniquely identify the gaming transaction. In one embodiment, after receiving the message, the server can implement a gaming transaction that involves communications between the server and the user controlled mobile device and between the server and the EGM.

In one embodiment, a gaming transaction can involve uploading information from the EGM and sending it to a destination accessible to the user. For example, game play results, such as a screen shot of a big win, can be uploaded to the server from the EGM and then sent from server to a user accessible destination, such as to the user's mobile device, e-mail account or Facebook™ account. In another embodiment, an application can be instantiated on the EGM as a result of the communications between the server and the user controlled device. For example, users, via their devices, can text information to the server that allows the server to access user funds. Then, the server can communicate with the EGM to enable the accessed funds to be transferred to the EGM. The user can then use the funds to engage in wager-based game play on the EGM.

Details of embodiments involving texting and e-mailing are described with respect to the following figures. In particular, a gaming system including texting and e-mail is described with respect to FIG. 1. A method in an EGM involving texting and e-mailing is described with respect to FIG. 2. With respect to FIG. 3, a method involving texting and e-mailing including a server in communication with multiple EGMs is discussed. Finally, with respect to FIGS. 4 and 5. Additional details of gaming devices including an EGM and the gaming system are described.

Texting and E-Mailing in a Gaming Environment

FIG. 1 shows a block diagram of a gaming system including EGMs, such as 2, a server 4 and mobile devices, such as 6, connected via a communications network, such as 8. Some portion of the EGMs in the system may not be equipped to communicate directly with mobile electronic devices, such as smart phones, carried by potential users of the EGMs. For example, these EGMs may not include a wireless or wired interface to establish communications with a mobile electronic device as well as the software logic necessary to process and parse information that enables communication session to be established with a mobile device.

Nevertheless, the gaming system 10 can include features that take advantage of mobile device capabilities even without requiring direct electronic communication between the EGMs and the mobile devices. Using the mobile device capabilities including its communication capabilities, certain gaming transactions can be simplified and enabled. In a particular example, texting and e-mail capabilities of a mobile device can be used to enable a number of different gaming transactions. Details of using mobile device texting and e-mailing capabilities in a gaming environment are described in more details as follows.

In particular embodiments, as part of a gaming transaction, a text or an e-mail address can be output from the EGM 2. In one example, the text or e-mail address can be a component of a temporary transaction address that is created when a gaming transaction is initiated. As described above, the temporary transaction address can also include a reference component used to uniquely identify the gaming transaction. The temporary transaction address can be associated with a particular gaming transaction and used as a mechanism for enabling communications used to complete the gaming transaction. Next, some details of gaming transactions are described, and then the use of the temporary transaction address in a gaming system to implement a gaming transaction is discussed.

When a gaming transaction is initiated, a gaming transaction record can be created for the gaming transaction. The gaming transaction record can include a number of status indicators for the gaming transaction. A first status indicator can be used to indicate the gaming transaction is open. In an open gaming transaction, additional information is needed from one or more sources to complete the transaction. When the additional information is received, the gaming transaction can be processed to its completion.

In a closed gaming transaction, the gaming system is no longer actively attempting to complete the gaming transaction. As an example, a gaming transaction can require one or more ordered responses to successfully complete the gaming transaction, such as a first response from a user controlled device followed by a second response from an EGM and followed by a third response from the user controlled device where particular information is received in each response. As described above, the responses from the user controlled devices can be sent to an address portion of a temporary transaction address.

A time period can be assigned to each needed response to complete the transaction. The time period can vary depending on the type of gaming transaction that is being implemented. In one embodiment, when a needed response is not received within its designated time period, the gaming transaction can be closed. Closing the gaming transaction can include changing the status of the first indicator in the gaming transaction record to indicate the gaming transaction is closed. If a needed response is received at the address associated with the gaming transaction after it is closed, the gaming system may be configured not to proceed to the next step or steps used to complete the gaming transaction. Thus, the response may be ignored.

A second status indicator included with the gaming transaction record can indicate whether the gaming transaction was successfully completed or not. Thus, a gaming transaction can be closed and marked as complete or closed and marked as incomplete. As described in the previous paragraph, a gaming transaction is typically not completed when a needed response is not received.

The needed response can include information used to complete the transaction or can be just the response itself. For example, the system can be configured to interpret just a message arriving at the address portion of the temporary transaction address as an indication of a user's desire to participate in the gaming transaction associated with the message. In another example, after receiving the message, the message can be parsed for information required to complete the transaction. When the information is found, the system can proceed to the next step or steps in the gaming transaction. When the information is not found, the system may close the transaction or may request a sender of the transaction to send the needed information. An example of needed information might be a PIN number used to access an account that is to be used in the gaming transaction.

When the gaming transaction is first opened a temporary transaction address can be created. The temporary transaction address can be referred to as "temporary" because it may only be valid as long as the gaming transaction is open. When the gaming transaction is closed, the system may ignore responses received at the address portion of the temporary transaction address. In one embodiment, the temporary transaction address can be unique in that there is only one open gaming transaction currently using the temporary transaction address. Thus, in some instances, the temporary transaction address can be assigned to a new gaming transaction that may have been used before for a past gaming transaction where the past gaming transaction is now closed. It may be desirable to re-use temporary transaction addresses to prevent the temporary transaction addresses from becoming too long and/or random looking.

In another embodiment, the gaming system can keep track of the temporary transaction addresses that have been created for gaming transactions and make sure that a unique temporary transaction address is only used only once. Thus, if any responses are received at the temporary transaction address after its associated gaming transaction is closed, the gaming system can be configured to ignore the messages. For example, spam messages can be sent to the address portion of the temporary transaction address and ignored by the system.

In one embodiment, the address portion of the temporary transaction address can be unique. For example, a unique e-mail address can be created for each transaction. In another embodiment, a reference component can be generated with the address portion of the temporary transaction address. The reference component can be included in the body of messages sent to the address portion. The address portion can be used for multiple gaming transactions where the messages sent to the address portion are distinguished according to the reference component in the body of the message. Messages without a known reference component or messages with a known reference component but associated with a closed gaming transaction can be ignored.

In the case where a temporary transaction address is re-used, such as a relatively unique e-mail address used for two different gaming transactions, the gaming system can be configured to acknowledge and/or process information in a message received at the address when the first gaming transaction is open. When the first gaming transaction is closed, the gaming system can ignore messages sent to the address. When a second gaming transaction is instantiated that reuses the address, then the gaming system can again recognize and attempt to parse messages received at the address as long as the second gaming transaction remains open.

In one embodiment, when a number of messages are received at a temporary transaction address after the gaming transaction in which it was used is closed, the gaming system can be configured to not re-use the temporary transaction address. For example, when the number of messages received at an e-mail address used for gaming transactions exceeds a threshold amount, the gaming system can be configured not to reuse the e-mail address. In another example, when a frequency at which messages are received at the e-mail address exceeds some threshold amount then the gaming system can be configured not to re-use the e-mail address.

As described above, the temporary transaction address can include a text or e-mail address portion. For example, a short code text mail can be a 5 or 6 digit number that is recognized by different mobile carriers in the United States. Different formats can be used internationally. A key word can be associated with the short code address. Often short codes are shared by different users where a unique key word or words is rented/leased by a particular entity. For example, a gaming establishment can rent or lease the key words, "bonus offer." For different gaming transactions, a unique identifier can be to the key word, such as a five digit number. Thus, a message, such as "text bonus offer 12345 to short code" can be output to a user of the gaming system to initiate the gaming transaction where "bonus offer 12345" is included in a text message sent to the short code. Based upon the use of the key words, "bonus offer," text messages can be routed to the gaming establishment. Then, using the unique identifier, such as a five digit number, a particular text message can be associated with a particular gaming transaction.

The gaming system can also be configured to use long code text message addresses. A long code text message address is a 10 digit phone number such as 777-777-7777. A temporary transaction address can involve generating a unique key word or words for the text message to be used as a reference component. For example, a bonus offer can be activated or accepted by texting "bonus offer 12345" to "777-777-7777." In another example, a transfer of credits to or from an EGM may be activated by texting "transfer credits 654321" to "777-777-7777. Thus, the same address portion of the temporary transaction address can be used for different types of gaming transactions where the key word or words identify the gaming transaction. As described above, the unique key word may be used as a transaction identifier for a gaming transaction and stored to gaming transaction record associated with the gaming transaction.

In different examples, a user can enter the key word and text message using a touch screen or keyboard on their mobile device and send the text message. In another example, a user can speak the keyword and the phone number using a voice recognition interface, such as Siri™ by Apple™. In another embodiment, the phone number in the text message can also include voice recognition capabilities. With this function, a user can call the number and then speak the key word or words associated with the temporary transaction address and any additional information that is required, such as a PIN, to enable a transaction.

Text message addresses also typically have an e-mail equivalent. For example, the e-mail address equivalent of a text message address is typically a number@something.extension. For example, the email address for 777-777-7777 can be 7777777777@carrier.com where the carrier is the name of the phone provider that provides the service for the number. Using the e-mail address, a user can send an e-mail message including a key word used as a reference component for the gaming transaction to the address. The reference component can be in the title or the body of the e-mail. When the e-mail message is received, it can be parsed for the key word and additional information such as the sender of the message.

The e-mail message can also be parsed for location related information, such as the IP addresses that were used. The IP address can indicate a geographic location from which the message was sent. In another example, a location sensor, such as GPS, can be used to include location information in the message. If the gaming system has output the address to a gaming device, such as an EGM, in a location such as Vegas, the gaming system using information obtained from a received message can determine the general area from which the message was sent. If a message is received at a temporary transaction address from a geographic location that doesn't generally match the geographic location in which the temporary transaction address was sent, then the gaming system might ignore the received e-mail. For example, if a temporary transaction address is output from an EGM located in Vegas and a response message is received at the address portion of the temporary transaction address from Romania, then the gaming system may ignore the received message.

The approach used for e-mail equivalents of text messages can also be used for e-mail addresses in general. For example, the system can generate a unique key word and an e-mail address which is transmitted to a user. The instructions given to the user can be e-mail the unique key word or words to bonusoffer@casino.com or transfercredits@casino.com. When an e-mail message is received at the address portion of the temporary transaction address including the unique keyword, then a gaming transaction can be enabled.

In another example, the unique key word can be used to generate the temporary transaction address and the key word may not need to be included in the body of the email. For example, a temporary transaction address, such as bonusofferxxxxx@casino.com can be generated where the x's represents a random combination of numbers, letters or symbols. The bonusofferxxxxx is the local part of the e-mail address and the casino.com is the domain name associated with the e-mail address. Thus, bonusofferxxxxxx can be a unique key word generated for the gaming transaction as well as a local portion of the temporary transaction address generated for the gaming transaction. The local part of the e-mail address might only be used once or could be re-used for different gaming transactions.

In one embodiment, the unique key word used as a reference component in a temporary transaction address or integrated into the address portion can be selected to be descriptive of the type of gaming transaction for which is it associated. For example, a gaming transaction involving a bonus offer can include "bonus," "offer," or "bonus offer" as part of the key words. As another example, a gaming transaction involving a transfer of credits can include "credits" or "transfer" as part of the unique key word. In yet another example, a gaming transaction involving a discount meal can include "discount," and/or "meal" as part of the key word. In a further example, if a player wishes to receive a screen shot of a big win they experienced at the EGM, the unique key word can include "big win" or "screen shot."

When a common key word is used for similar gaming transactions, then the gaming system can be configured to add an additional component to the common key word, such as a randomly selected combination of letters, symbols and/or numbers. In yet another embodiment, the entire key word can be randomly generated. In a further embodiment, words or phrases can be randomly selected for use as a key word but the words may not be descriptive of the gaming transaction. However, the selected words can be gaming related. For example, words, such as "fun," "excitement," or a phrase, such as "big win" can be selected for the gaming transaction. In another example, key words can be randomly selected from a word set that may or may not include gaming related words. As described above, another portion can be added to the selected key word, such as a randomly generated component, to make the key word unique within the context of the gaming system.

In other embodiments, an EGM or a server can be configured to send an e-mail or a text message to a mobile device. A response to the e-mail or the text message can be used to validate a transaction. A player wishing to initiate a transaction, such as a transaction involving an electronic transfer credits to the EGM, can initiate the electronic transfer in some manner. For example, the player can swipe or move their phone near and NFC interface on the EGM to initiate the transaction or sensors on or near the EGM can detect the presence of the mobile device. Based on the detected presence of the mobile device, a transaction can be initiated by an EGM and/or a server.

Next, the mobile device can be identified if it has not already been identified. For instance, the player may have been previously registered the phone with a gaming system, such as supplying phone information as part of registration with a player tracking club. The player tracking information can include additional information about the owner of the device, such as an e-mail address that they utilize. In one embodiment, the information received from the mobile device, such as mobile device identifier, can be used to locate the player tracking account containing additional information about person or persons associated with the mobile device. In another embodiment, a player tracking account number can be received from the mobile device which can be used to locate additional information stored in a player tracking account, such as information about an owner associated with the mobile device.

Using the identification information, the EGM or server can send an electronic communication that is received on the mobile device. For example, a text message can be received on the mobile device or an e-mail can be received on an e-mail account that is accessible on the mobile device. The text message or e-mail may include information, such as "You have initiated a transaction (e.g., an electronic fund transfer), reply to this message to proceed." When the response is received by the EGM and/or a remote server, then the message can be used as an indication to proceed with the transaction.

In one embodiment, the EGM and/or the server can send out multiple messages, such as an e-mail message to an e-mail account and a text message to the mobile device. The e-mail account may not be accessible on the mobile device or may be password protected such that even if the person possesses the mobile device, a reply may not be possible unless the password for the mail account is known. The use of multiple electronic communications can provide additional security because if the mobile device is stolen or being used in unauthorized manner, the second message to an e-mail account that is not accessible or easily accessible on the phone can allow the owner of the phone to determine their device is not being used in an authorized manner.

In one embodiment, the response to the validation message received on the mobile device may require proper entry of some type of information. For example, the response to the message may require the user to enter a correct PIN or Password. In another example, the response to the message may require the user to correctly answer a challenge question. The device receiving the message, such as a server or the EGM, can be configured to parse the reply message to locate the validation information and then determine whether the validation information is correct. When the validation information is correct, the EGM and/or the server can move to the next steps necessary to complete the transaction. When the validation information is incorrect, the EGM and/or server may send a reply message with a message that indicates the validation information is incorrect and the transaction will not proceed. In one embodiment, the recipient may be able to reply to this message with the correct validation information that is required.

Next, some examples of utilizing texting and e-mailing including temporary transaction addresses to perform gaming transactions is described with respect to FIG. 1. The EGM 2 can be located in a gaming environment where wager-based gaming permitted. A user associated with mobile device 6 can interact with the EGM 2 to play a wager-based game.

At some point while the user is interacting with the EGM a gaming transaction can be initiated and a temporary transaction address which may include a unique reference component for the gaming transaction can be created. In one embodiment, a logic device on the EGM 2 can generate and/or select the temporary transaction address that is to be utilized. For example, a group of temporary transaction addresses can be allocated to the EGM 2 and the EGM 2 can select from among the allocated addresses. In another embodiment, the EGM 2 can communicate with server 4 using the communication interface 26 to receive a temporary transaction address from the server 4. In different embodiments, the communication including the temporary transaction address can be initiated by the server 4 or in response to a request received from the EGM 2. The server 4 can communicate with the EGM 2 via the communication interface 38.

The gaming transaction can be initiated in response to an input received at an input mechanism 28 on the EGM 2. For example, a button on the EGM 2 can be actuated to initiate the gaming transaction or an activation of a touch screen can be detected to initiate the gaming transaction involving a temporary transaction address. In some embodiments, game play related activities, such as input of credits, a cash out request, a zero credit condition and game results, such as a large award, can cause a gaming transaction to be initiated. The game play related activities can be monitored and by a logic device on the EGM 2, such as processor/memory 34, and/or a logic device on server 4, such as processor/memory 52. Based upon the monitoring, these logic devices can initiate a gaming transaction that involves the generation of a temporary transaction address.

In one embodiment, the logic device 34 on the EGM 2 that initiates the gaming transaction can be part of the game controller that controls the wager-based game played on the EGM 2. In another embodiment, the logic device 34 can be part of a secondary device, such as a player tracking unit, a card reader or a printer, coupled to the EGM 2. In yet other embodiments, the gaming controller and a separate logic device on a secondary device can trigger a gaming transaction using a temporary transaction address in cooperation with one another. For example, the gaming controller can report information to the separate logic device which then initiates the transaction.

The server 4 can include the temporary addressing component 40 for generating a temporary transaction address. The temporary addressing component 40 can include software instructions executed under control of the processor/memory 52. The temporary addressing component 40 can be configured to select an appropriate text or e-mail address for the transaction and generate a reference components, such as unique key words. If a key word or key words are used that are descriptive of the gaming transaction, the server 4 can be configured to select one or more key words that are descriptive of the gaming transaction. In addition, the server can generate or select an additional identifier, such as a random number to associate with or ad to the key word.

When the gaming transaction is initiated, the server 4 can create a gaming transaction record and store the temporary transaction address and/or the unique key words to one of the databases 48. In addition, the server 4 can initialize status indicators for the gaming transaction that indicate whether the gaming transaction is open or closed and whether the gaming transaction is complete or not and store them to the gaming transaction record. The generation and maintenance of the gaming transaction record can be part of the transaction processing 42.

The temporary transaction address that is created for the gaming transaction and a description of the gaming transaction can be output on the EGM 2. In one embodiment, the temporary transaction address and a description of the gaming transaction can be output to an output mechanism, such as the main display of the EGM 2, under control of the game controller. In another example, the game controller can cause a ticket including the temporary address and the gaming transaction description to be output from a printer on the EGM. In another embodiment, the temporary transaction address and a description of gaming transaction can be output to an output mechanism under control of a secondary controller. For example, a card reader controller can control output of the temporary transaction address and the transaction description to a display. In yet another example, the temporary transaction address and the transaction description can be output in a "service window" in the EGM that is controlled by server 4. Details of a service window are described below with respect to FIGS. 4 and 5.

The temporary transaction address, a description of the gaming transaction and instructions related to the gaming transaction can be output and received by the player. For example, a message, such as "send a text including 'unique key word' to 'xxx-xxx-xxxx' to receive a screen shot of your big win" or "send a text including 'unique key word' to 'xxx-xxx-xxxx' to receive a discount buffet," can be output via 30. As another example, a message, such as "send an e-mail to bonusoffer1234@casino.com to have promotional credits downloaded to your EGM," can be output via 30. In yet another example, a printed ticket with the message, "send an e-mail including 'unique keyword,' your name and telephone number to dailylottery@casino.com by the end of the day to be entered into our daily lottery for one thousand dollars."

In response to the output message, a user can use their mobile device 6 to generate and send a message using the temporary transaction address. The user can utilize communication interfaces 20, display 22 and input mechanism 24 to send the message. In one embodiment, the message can be sent to server 4 where the server is used to mediate the gaming transaction involving the EGM 2 and the mobile device 6. The server 4 may reply to messages it has received from a message source, such as but not limited to mobile devices, using the server to mobile logic 46. In this example, the mobile device 6 doesn't send direct communications to the EGM 2 and the EGM 2 doesn't send direct communications to the mobile device 6. In addition, the EGM 2 or the mobile device 6 may not have the information necessary to communicate electronically with one another. This architecture may be beneficial for security purposes because it eliminates the need to have the EGM 2 receive and process communications from devices accessible via a wide area network such as the network.

The server 4 can be configured to communicate with the EGMs in response to e-mail or text messages it has received from electronic devices, such as mobile device 6, using the server to EGM logic 44. The EGM 2 can respond to the server using the EGM to server logic 32. In one embodiment, an e-mail client can be instantiated on the server 4 and/or the EGM to enable communications. However, other types of electronic communications and protocols can also be utilized for EGM to server communications. For example, a communication protocol, such as G2S (Gaming Standards Association, Fremont, Calif.), can be used.

The communications between the mobile device 6 and the server 4 can be enabled via communications networks 8. The communication networks 8 can involve resources native to a casino, such as an internal network, non-native resources, such as cellular network 18 associated with the mobile device service provider, and access to the Internet 14. For example, via a Wi-Fi connection the mobile device 6 can communicate with a wireless access point 16 which connects to a local area network, such as a network that is only available within in a casino and doesn't allow devices from the outside to connect. Via the internal network, the mobile device 6 can send communications to server. In another, the mobile device 6 can communicate with wireless access point 16 which is coupled to the Internet 14 and reach the server 4 via the Internet 14. In another example, the mobile device 6 can connect to cellular network 18, which is coupled to the Internet 14, and the reach the server 4 via the Internet 14.

After a text or e-mail message is received from a message source, such as a mobile device, the server 4 as part of the transaction processing 42, can attempt to determine whether the message is associated with a gaming transaction and then determine whether the gaming transaction is open or not. In one embodiment, the server 4 can maintain a list of temporary transaction address that are currently open and when a new message is received search to see if the new message is associated with one of the temporary transaction addresses on the list. If the server determines the message is associated with an open gaming transaction, the server 4, depending on the type of transaction, can initiate one or more additional communications to complete the gaming transaction. For example, to send a screen shot from the EGM, the server 4 can request the screen shot from the EGM 2 and then after it is received reply to the message sender with a message including the screen shot. In another example, to perform a financial transaction, the server 4 can request a PIN and amount from the message sender (e.g., mobile device 6), receive the PIN at the text or e-mail address for the gaming transaction, validate the PIN and then communicate with the EGM 2 to add the credits.

In one embodiment, for a given gaming transaction, information received from different sources, such as the mobile device 6 or the EGM 2 can be stored for auditing purposes. The stored information can be used to establish an audit trail for the transaction. For example, in the financial transaction described above, a description of the information received from the mobile device, such as the PIN, identification information associated with the mobile device, such as a phone number or device identification number, and a time the information was received can be stored for transaction auditing purposes. In addition, the interaction with the EGM 2, such as an identifier associated with EGM, an amount of credits sent to the EGM and information output from the EGM, such as the temporary transaction address and when it was output, can be stored. In one embodiment, the auditing component 50 can be used to store information used to establish an audit trail for a gaming transaction. The auditing information may be stored in a gaming transaction record maintained by the system.

In some embodiments, some gaming transactions may require a message source, such as mobile device 6 or an e-mail account accessible from mobile device 6, to be from a known source before the transaction is completed. For example, when the server 4 receives a message, the server 4 can determine that the message is associated with an open gaming transaction. Then, depending on the transaction type, the server 4 can attempt to determine, before proceeding with the transaction, whether the source of the text message or e-mail message is known. If the source is not known, then the gaming transaction may not be completed. For example, the server 4 may not recognize a message to a temporary transaction address for a financial transaction unless the message source can be identified. Via a mechanism, such as a loyalty program, a user may be able to provide ahead of time identification information for message sources, such as a phone number for mobile device 6, which allows the message source to be recognized by the server 4.

Whether the message needs to be from a known source can vary from transaction to transaction. For example, for a financial transaction under $20 dollars, the system may not require the message to be from a known source. However, for a financial transaction over $20, the system may require the message to be from a known source. As another example, a message sent to claim a screen shot from the EGM 2 can be accepted whether it is from a known source or an unknown source.

As described above, certain transactions may require responses. For example, to enable a gaming transaction, a message may have to be sent to a temporary transaction address output via the EGM 2. For each required response, the response can be expected before one or more events occur, such as before a time period elapses or some other event is detected on the EGM 2. If the response doesn't occur before the one or more events occur, then the gaming transaction may be closed. In one embodiment, the determination and monitoring of timing for responses in different transactions can be handled by the transaction processing logic 42.

Certain gaming transactions can be configured to occur while a player is at the EGM. Thus, if an event occurs that indicates that the player is no longer at the EGM 2 after the gaming transaction has been initiated, the gaming transaction can be closed. For example, if a gaming transaction involves an offer to add credits to the EGM 2, the gaming transaction may be closed if a message is not received at the temporary transaction address prior to one or more of a time period expiring, an amount of idle time being detected on the EGM 2, a zero credit condition being detected at the EGM 2, a person no longer being present at the machine via received sensor information (e.g., image data from a camera) or a cash out command being detected at the EGM. In some embodiments, the gaming system can be configured to detect a presence of a mobile device 6 near an EGM 2 and make a determination as to whether the mobile device 6 is associated with a user interacting with the EGM 2. In this embodiment, a gaming transaction may be closed when it is determined that the mobile device 6 is no longer near the EGM 2.

Other gaming transaction can be configured to occur while the user is at the EGM 2 or after the user has left the EGM 2. For example, after a big win on an EGM 2, a gaming transaction can be initiated that allows a user to receive a screen shot or other information related to their big win (In general, this could be offered after any game that is played). The EGM 2 can output a temporary transaction address for the gaming transaction. When a message is received at the temporary transaction address, the screen shot or the other information can be sent to the message sender.

The system can be configured to hold the screen shot for some period. The time period can extend beyond a time when the player is still at the EGM 2. For example, the information can be held for a day or a week. If a message is not received within the time period, then the system can delete the information. As an example, when a big win occurs, the EGM 2 can save gaming information, such as a screen shot, to the application data 36. A gaming transaction can be initiated where the server 4 sends a temporary transaction address to the EGM 2 that is output to a user. The temporary transaction address can be used to claim the gaming information including the screen shot. The EGM 2 can upload the gaming information to server 4 at some point, such as after the temporary transaction address is output on the EGM 2.

If the server 4 receives a message at the temporary address within some time period, then the server 4 can send the gaming information including the screen shot to the message sender. If the time period expires, the server 4 can close the transaction, mark the transaction as incomplete and optionally delete the gaming information. If the message is received at the temporary transaction address after the gaming transaction is closed, the server 4 can be configured to complete the transaction in an alternate manner. For example, if a message is received after the gaming information has been deleted, the server 4 can respond to the message with an alternate such as "Sorry your gaming information is no longer available. However, use the information in this message to receive 10 promotional credits on your next visit." Thus, the gaming transaction can be completed in an alternate manner.

In one embodiment, the gaming information including the screen shot associated with the transaction can be stored on the EGM 2 and then the server 4 can later request the information from the EGM 2 to complete the transaction. After the information is sent to the server 4, it can be deleted from the EGM 2. In another embodiment, the EGM 2 can send the information to the server 4 and not store the information locally. Thus, the server 4 may not to contact the EGM 2 at a later time to complete the transaction.

Methods in a Gaming System

In this section, details involving text and e-mail messages used in a gaming system for gaming transactions are described. In particular embodiments, a method on an EGM is described with respect to FIG. 2 and a method on a server is described with respect to FIG. 3. FIG. 2 shows a flow chart of a method 300 in an EGM including temporary transaction addresses. In 302, a transaction description can be output from the EGM. The transaction can be a message such as "would you like to transfer credits using your mobile device?" or "would you like a screen shot of your big win?" In 304, the EGM can receive an indication that a user would like to proceed with the transaction. For example, a button can be actuated on the EGM to indicate the user's desire to proceed with the transaction. In 306, in response to receiving an indication that the user wishes to proceed with the gaming transaction a temporary transaction address can be output at the EGM. In one embodiment, the temporary transaction address can be received from a remote server.

In an alternate embodiment, a temporary transaction address and transaction description can be output from the server simultaneously. For example, a message, such as "text financial1234 and the transaction amount to 777-777-7777 to initiate a financial transaction, can be output from the EGM. In this example, the address portion of the temporary transaction address is 777-777-7777 and the reference component for the transaction is financial 1234. The acknowledgement to proceed with the financial transaction occurs when a message with the reference component is received at the address portion of the temporary transaction address occurs before any event occurs that causes the gaming transaction to be closed. After validating the message, the server 4 can attempt to complete the gaming transaction which can involve additional communications with the message sender and/or the EGM.

In 308, the EGM can receive a message from the EGM indicating the gaming transaction associated with the temporary transaction address has been verified. In 310, the EGM can interact with the server if necessary to complete the transaction. For example, in the case of a financial transaction, the EGM can interaction with the server to transfer credits to or from the EGM. In 312, the EGM implement the EGM side of the transaction, such showing an increase or decrease in the credit meter on the EGM to complete a financial transaction and/or displaying a message to indicate the gaming transaction has been completed.

FIG. 3 shows a flow chart of a method 400 in a server including temporary transaction addresses. In various embodiments, one or more steps performed by the server can be alternatively performed by the EGM. In 402, a server can receive a request to initiate a transaction from the EGM. Alternatively, the server 402 can make a determination to initiate a gaming transaction. In one embodiment, the server 402 can make the determination based upon information received from the EGM regarding its current status.

In 404, a gaming transaction record can be opened. Information that identifies the EGM participating in the gaming transaction can be stored to the gaming transaction record. In 406, one or more transaction response time periods and/or events that are to be monitored can be determined. As described above, a gaming transaction may require a particular response before the gaming transaction can be completed. If the particular response is not received before an event occurs, such as a time period elapsing or an event on the EGM occurring, the server can be configured to close the gaming transaction before it is completed. The status of a gaming transaction when a gaming transaction is closed, such as completed or incomplete, can be stored to the gaming transaction record.

In 408, the server can generate a temporary transaction address for the gaming transaction. The temporary transaction address can include an address portion, such as a text or e-mail address, and optionally a reference portion, such as a unique key word or key words, that the server uses to match a received message to a particular gaming transaction. The temporary transaction address can be stored to the gaming transaction record. In 410, the server can send the temporary transaction address to the EGM from which it can be output. Further, the server can store details of the gaming transaction that allow it to be carried out if a message is received to the gaming transaction record or that cause the gaming transaction to be closed before completion. The server can monitor the open gaming transactions to determine whether events have occurred that allow a next step in the gaming transaction to be carried out or cause a gaming transaction to be closed.

In 412, the server can detect that a response has been received at an address associated with an open gaming transaction. In 414, the server can parse information from the request, such as to locate a reference component for the transaction when required, details about the message sender and information needed to complete the gaming transaction. The details about the message sender can reveal information about the device that sent the message, such as a phone number of a device that sent a text message or an e-mail account from which the message was sent including IP address information. Using the parsed information, the server can make a determination as to whether to proceed with the gaming transaction.

In 416, for some gaming transactions, the server can receive information from the EGM. As an example, in one embodiment, the server can receive diagnostic information, metering information or hardware performance information from the EGM that is to be sent out to a remote device. The information received from the EGM can be screened before it is sent out. In one embodiment, the gaming machine operator can specify the information screening criteria which can vary from gaming transaction to gaming transaction depending on the type of data that is being sent out from the EGM. Details about the information screened and its source and destination can be stored to the gaming transaction record for auditing purposes.

In 418, the server can interact with the server and/or message sender to complete the transaction if required. For example, after receiving a message from the message sender, the EGM can send information to the message sender to complete the transaction. In 420, the server can determine one or more response time periods have been exceeded or other events have occurred that caused the transaction to be closed before it is completed. In 422, in response to one of the events, the server can close the gaming transaction and mark as incomplete.

Gaming Devices and Systems

Figure 5:
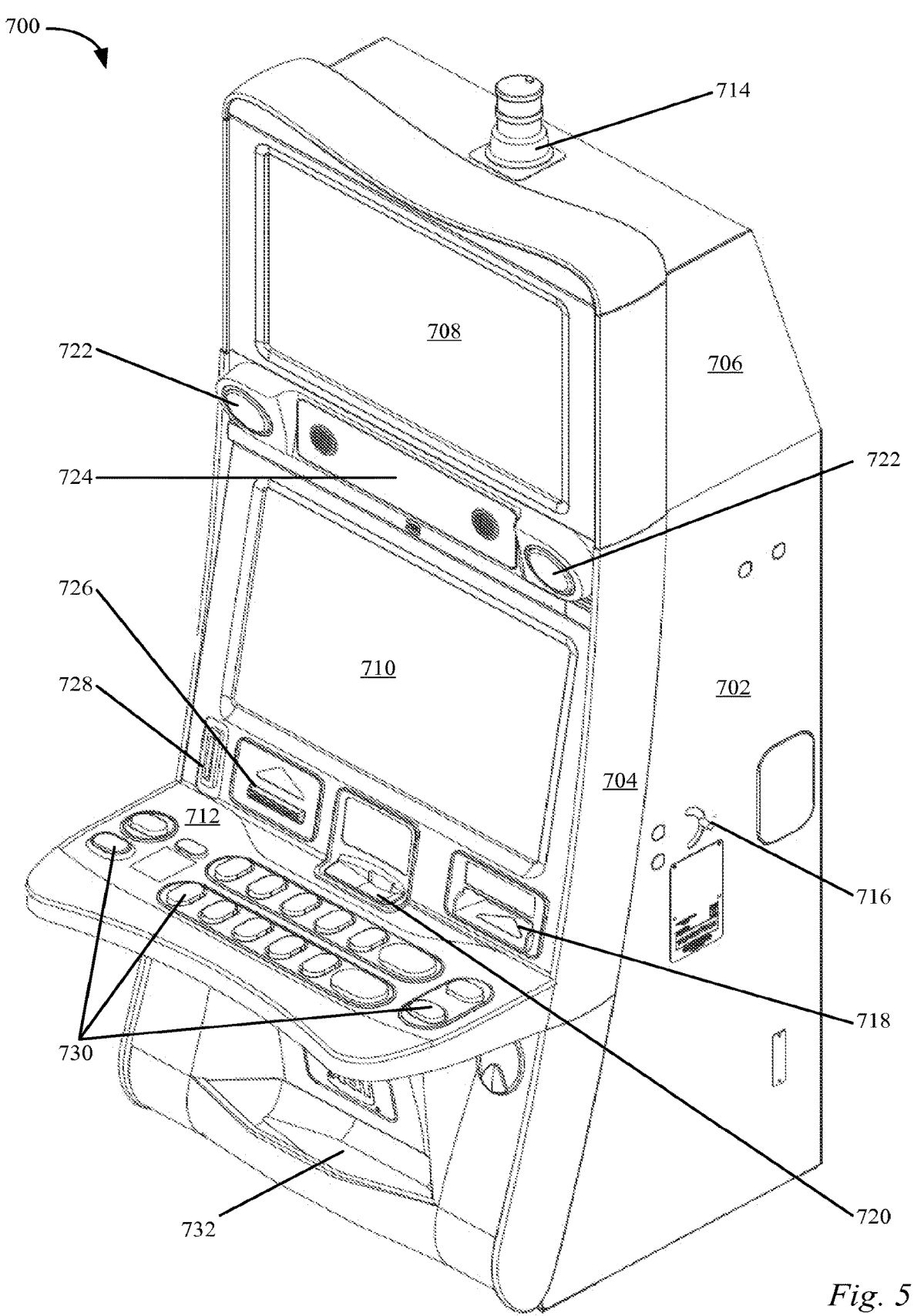
FIG. 5 shows a perspective drawing of a gaming device in accordance with the described embodiments.

Next additional details of EGMs and gaming systems are described with respect to FIGS. 4 and 5. FIG. 4 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630.

The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, a receipt indicating the acceptance of a virtual ticket voucher or virtual currency on the gaming device can be displayed in the service window in a QR code format and transferred to a user's portable electronic device via an image capture device on their portable electronic device. In another embodiment, virtual ticket voucher information can be transferred to a portable electronic device as optically formatted image data.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 4, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 5, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 5 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention is claimed as follows:

1. A system comprising:
a processor; and
a memory device that stores a plurality of instructions that, when executed by the processor, cause the processor to:
cause a display, by a display device, of a single temporary transaction address associated with a plurality of different available funding transactions,
responsive to a first message comprising first transaction information being communicated to the single temporary transaction address and an occurrence of a first authorization of a first electronic fund transfer of a first amount of funds, modify, by the first amount of funds and for a first funding transaction of the plurality of different available funding transactions associated with the single temporary transaction address, a credit balance of an electronic gaming machine, and
responsive to a second, different message comprising second, different transaction information being communicated to the same single temporary transaction address and an occurrence of a second authorization of a second, different electronic fund transfer of a second, different amount of funds, modify, by the second, different amount of funds and for a second, different funding transaction of the plurality of different available funding transactions associated with the single temporary transaction address, the same credit balance of the same electronic gaming machine.

2. The system of claim 1, wherein the single temporary transaction address comprises one of an e-mail address and a text message address.

3. The system of claim 1, wherein at least one of the first message and the second message is communicated to the single temporary transaction address from a mobile device.

4. The system of claim 1, wherein the single temporary transaction address is associated with the electronic gaming machine.

5. The system of claim 1, wherein the first transaction information of the first message comprises a first reference component identifying the first transfer of the first amount of funds.

6. The system of claim 5, wherein the first reference component comprises a first key word in any of a title of the first message and a body of the first message.

7. The system of claim 5, wherein the second, different transaction information of the second, different message comprises a second, different reference component identifying the second transfer of the second, different amount of funds.

8. A system comprising:

a processor; and a memory device that stores a plurality of instructions that, when executed by the processor, cause the processor to:

cause a display, by a display device, of a single temporary transaction address associated with a plurality of different available modifications of an electronic gaming machine, monitor any messages communicated to the single temporary transaction address, responsive to a first monitored message comprising first information associated with a first reference component being received at the single temporary transaction address, communicate data to the electronic gaming machine that results in a first modification of the plurality of different available modifications of the electronic gaming machine, the first modification being at least partially based on the first message, and responsive to a second, different monitored message comprising second, different information associated with a second, different reference component being received at the same single temporary transaction address, communicate data to the electronic gaming machine that results in a second, different modification of the plurality of different available modifications of the electronic gaming machine, the second, different modification being at least partially based on the second, different message.

9. The system of claim 8, wherein the single temporary transaction address comprises one of an e-mail address and a text message address.

10. The system of claim 8, wherein at least one of the first monitored message and the second, different monitored message is communicated to the single temporary transaction address from a mobile device.

11. The system of claim 8, wherein the first monitored message is associated with a first user and the second, different monitored message is associated with a second, different user.

12. The system of claim 8, wherein the first reference component comprises data associated with a first funding transaction and the second, different reference component comprises data associated with a second, different funding transaction.

13. The system of claim 8, wherein the first reference component comprises data associated with at least one of: a first event displayed by the electronic gaming machine, and a first promotion to be displayed by the electronic gaming machine, and the second, different reference component comprises data associated with at least one of: a second, different event displayed by the electronic gaming machine, and a second, different promotion to be displayed by the electronic gaming machine.

14. A method of operating a system, the method comprising:

displaying, by a display device, of a single temporary transaction address associated with a plurality of different available funding transactions, responsive to a first message comprising first transaction information being communicated to the single temporary transaction address and an occurrence of a first authorization of a first electronic fund transfer of a first amount of funds, modifying, via a processor and by the first amount of funds and for a first funding transaction of the plurality of different available funding transactions associated with the single temporary transaction address, a credit balance of an electronic gaming machine, and responsive to a second, different message comprising second, different transaction information being communicated to the same single temporary transaction address and an occurrence of a second authorization of a second, different electronic fund transfer of a second, different amount of funds, modifying, via the processor and by the second, different amount of funds and for a second, different funding transaction of the plurality of different available funding transactions associated with the single temporary transaction address, the same credit balance of the same electronic gaming machine.

15. The method of claim 14, wherein the single temporary transaction address comprises one of an e-mail address and a text message address.

16. The method of claim 14, wherein at least one of the first message and the second message is communicated to the single temporary transaction address from a mobile device.

17. The method of claim 14, wherein the single temporary transaction address is associated with the electronic gaming machine.

18. The method of claim 14, wherein the first transaction information of the first message comprises a first reference component identifying the first transfer of the first amount of funds.

19. The method of claim 18, wherein the first reference component comprises a first key word in any of a title of the first message and a body of the first message.

20. The method of claim 18, wherein the second, different transaction information of the second, different message comprises a second, different reference component identifying the second transfer of the second, different amount of funds.

* * * * *